United States Patent
Groot

(10) Patent No.: US 12,035,694 B2
(45) Date of Patent: Jul. 16, 2024

(54) FEED-MIXING DEVICE HAVING A CALIBRATING FUNCTION

(71) Applicant: LELY PATENT N.V., Maassluis (NL)

(72) Inventor: Steffen Christiaan Groot, Maassluis (NL)

(73) Assignee: LELY PATENT N.V., Maassluis (NL)

( * ) Notice: Subject to any disclaimer, the term of this patent is extended or adjusted under 35 U.S.C. 154(b) by 870 days.

(21) Appl. No.: 17/256,304

(22) PCT Filed: Jun. 24, 2019

(86) PCT No.: PCT/NL2019/050387
§ 371 (c)(1),
(2) Date: Dec. 28, 2020

(87) PCT Pub. No.: WO2020/013686
PCT Pub. Date: Jan. 16, 2020

(65) Prior Publication Data
US 2021/0259203 A1    Aug. 26, 2021

(30) Foreign Application Priority Data
Jul. 10, 2018    (NL) ..................................... 2021276

(51) Int. Cl.
*A01K 5/00* (2006.01)
*A01K 5/02* (2006.01)
(Continued)

(52) U.S. Cl.
CPC ............ *A01K 5/001* (2013.01); *A01K 5/0283* (2013.01); *B01F 27/9214* (2022.01);
(Continued)

(58) Field of Classification Search
CPC .... A01K 5/001; A01K 29/005; A01K 5/0283; A01K 5/0233; A01K 5/004;
(Continued)

(56) References Cited

U.S. PATENT DOCUMENTS 5,119,893 A    6/1992   Jost
9,382,070 B2 *  7/2016   Halbritter .............. B65G 15/64
(Continued)

FOREIGN PATENT DOCUMENTS

CN    102559966 A    7/2012
CN    104778574 A    7/2015
(Continued)

OTHER PUBLICATIONS

International Search Report, issued in PCT/NL2019/050387, dated Sep. 24, 2019.
(Continued)

*Primary Examiner* — Yvonne R Abbott-Lewis
(74) *Attorney, Agent, or Firm* — Birch, Stewart, Kolasch & Birch, LLP

(57) ABSTRACT

A feed-mixing device for receiving, mixing and dispensing animal feed includes a frame with a mixing bin for receiving and mixing the animal feed therein and dispensing it therefrom, at least one mixing device rotatably drivable in the mixing bin using a drive, in particular a vertical mixing auger, for mixing the received animal feed, and a weighing device for determining the weight of the animal feed received in the mixing bin, comprising N weighing elements, with N≥2, each of which emits a weighing signal, and a control system for controlling the feed-mixing device and for processing the weighing signals from the weighing elements to produce the determined weight. The control system is configured to perform an, in particular fully automatic, calibration action of the weighing elements. The calibration action includes driving the at least one mixing device, reading out the respective weighing signal of each of the N weighing elements in each of M different positions of the mixing device, with M≥N, calibrating the weighing elements on the basis of the read-out weighing signals, (Continued)

Figure 1:
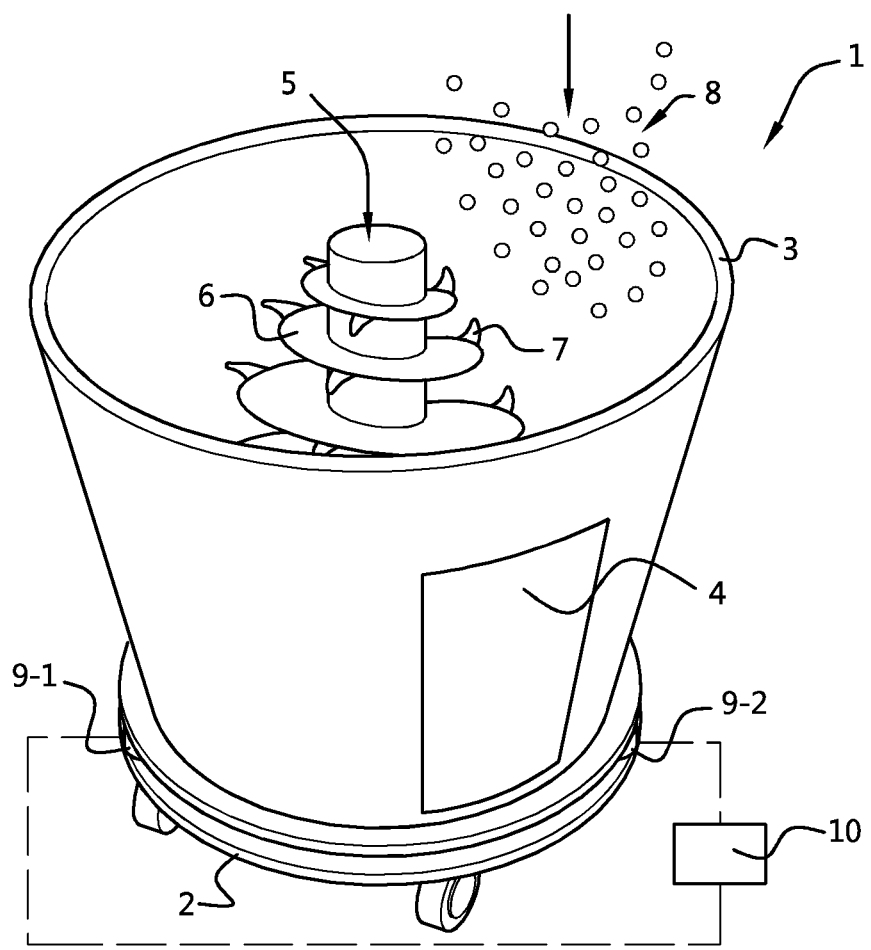

wherein the calibrating at least includes determining a respective correction factor for the weighing signal of each weighing element by analysing the read-out weighing signals of all weighing elements. Thus, all weighing elements may be calibrated without having to detach the weighing elements, which provides very reliable weight measurements in a very simple manner.

20 Claims, 2 Drawing Sheets

(51) Int. Cl.
*B01F 27/921* (2022.01)
*B01F 35/21* (2022.01)
*G01G 23/01* (2006.01)
*B01F 101/18* (2022.01)

(52) U.S. Cl.
CPC .......... *B01F 35/2117* (2022.01); *G01G 23/01* (2013.01); *B01F 2101/18* (2022.01)

(58) Field of Classification Search
CPC .............. B01F 27/9214; B01F 2101/18; B01F 35/2117; G01G 23/01
See application file for complete search history.

(56) References Cited

U.S. PATENT DOCUMENTS

| | | |
|---|---|---|
| 11,378,441 B2* | 7/2022 | Dai ........................ G01G 23/00 |
| 2011/0073525 A1 | 3/2011 | Evans |
| 2015/0118376 A1 | 4/2015 | Huyzer et al. |
| 2015/0268089 A1 | 9/2015 | Xie et al. |
| 2017/0223926 A1 | 8/2017 | Ausman et al. |

FOREIGN PATENT DOCUMENTS

| | | |
|---|---|---|
| EP | 2 838 350 B1 | 6/2016 |
| WO | WO 2013/157931 A1 | 10/2013 |
| WO | WO 2017/061613 A1 | 4/2017 |

OTHER PUBLICATIONS

Written Opinion of the International Searching Authority, issued in PCT/NL2019/050387, dated Sep. 24, 2019.
English machine translation of WO 2017/061613 A1 dated Apr. 13, 2017, pp. 1-18.

* cited by examiner

FEED-MIXING DEVICE HAVING A CALIBRATING FUNCTION

The present invention relates to a feed-mixing device configured to receive, mix and dispense animal feed, comprising a frame, a mixing bin attached to the frame for receiving and mixing said animal feed therein and dispensing it therefrom, at least one mixing device which is rotatably drivable in the mixing bin for said mixing of said received animal feed, a weighing device for determining the weight of the animal feed received in the mixing bin, comprising N weighing elements, N≥2, each of which emits a weighing signal, as well as a control system for controlling the feed-mixing device and for processing the weighing signals from the plurality of weighing elements to produce the determined weight.

Such devices, often feed-mixing wagons, are generally known in the field of animal feed devices. The control system determines the weight of the feed received in the mixing bin using the weighing signals of the weighing elements, and can make further decisions on the basis thereof, such as stopping to fill or determining how much of another type of feed has to be added. One important application is to control the dispensing of feed from the feed-mixing wagon by means of the determined weight, with the dispensed amount of feed being determined from the weight difference of the mixing bin.

Obviously, it is important in this case for the weighing signals to be reliable. However, the weighing signal of a weighing element will drift over the course of time or will become less accurate or reliable due to bending or otherwise. For example, a knock or deflection may bring one or more weighing elements slightly out of alignment or the like. In order to compensate for this, the weighing elements have to be calibrated every now and then, so that a correct measurement result can again be ensured. However, this is a laborious process, in which the weighing elements are often uncoupled and are tested and calibrated in a separate procedure. Because of the fact that it is a laborious process, it is often dispensed with in practice, so that the feed-mixing device will in many cases be inaccurate.

It is an object of the present invention to at least partly solve the abovementioned problems and to this end a feed-mixing device according to Claim 1 is provided, in particular a feed-mixing device configured to receive, mix and dispense animal feed, comprising a frame with a mixing bin attached to the frame for receiving and mixing said animal feed therein and dispensing it therefrom, at least one mixing device which is rotatably drivable in the mixing bin for said mixing of said received animal feed, and a drive for the at least one mixing device, and a weighing device for determining the weight of the animal feed received in the mixing bin, comprising N weighing elements, N≥2, each of which emits a weighing signal, and a control system for controlling the feed-mixing device and for processing the weighing signals from the plurality of weighing elements to produce the determined weight, wherein the control system is configured to perform a calibration action of said weighing elements, wherein the calibration action comprises: driving the at least one mixing device, reading out the respective weighing signal of each of the N weighing elements in each of M different positions of the mixing device, with M≥N, calibrating the weighing elements on the basis of the read-out weighing signals, wherein the calibrating at least comprises determining a respective correction factor for the weighing signal of each weighing element by analysing the read out weighing signals of all weighing elements.

The present invention is based on the insight that the weighing elements do not have to be uncoupled separately in order to be calibrated. Rather, the weighing signals are determined simultaneously at each of M positions, thus M sets of N weighing signals being obtained. Then, the respective correction factors are determined after analysis of those sets of weighing signals. The advantage is thus that with this feed-mixing device, the user or otherwise does not have to perform any uncoupling actions, and that the calibration can be performed in a fully automatic way. Due to this increased convenience, as well as the fact that the calibration is automatic, such a calibration may therefore be performed much more frequently, so that it is much easier to ensure accurate feed measurement.

The analysis of the weighing signals for the sake of calibration comprises collecting a sufficient amount of data, at least weighing signals, and solving suitable corresponding equations using these data. In principle, the manner in which calibration is performed is not subject to any particular limitation, but at a later stage in this description, a useful example will be elaborated upon in more detail. After the calibration action, a correction factor is available for each weighing element. The control system is configured to multiply the weighing signal of a weighing element by the associated correction factor in order to produce the corrected weighing signal of said weighing element. Finally, the control system can add up each of the corrected weighing signals to produce the total measured weight. Obviously, the control system is configured to measure the weight of the feed received in the mixing bin by taring the momentary total weighing signal with the original "bin empty" weighing signals. In this case, it should furthermore be noted that the correction factors, or calibration factors, are thus used to adjust/set the feed-mixing device on the basis of the calibration action. The control system is obviously configured to perform the calibration action, in particular in an automatic manner. With this calibration action, the mixing device does not necessarily have to be stationary, although this may have the advantage that no vibrations caused by movements can disrupt the measurements. On the one hand, measurements can be performed more quickly in the case of a moving mixing device, and it is even possible to measure continuously, but, on the other hand, this is also a more realistic measurement, because the mixing device will, in practice, actually usually be moving. Incidentally, in the present application, no distinction is made between "weight" and the "mass" determined in this case by weighing.

Dependent embodiments are described in the dependent claims, as well as in the following description.

The mixing device is not subject to any particular limitation as such and comprises, for example, horizontal mixing rollers or augers. However, advantageously, the mixing device comprises one or more vertical mixing augers. In particular with a vertical mixing auger, a discernible cyclic variation may occur in the weighing signal, even with an empty bin. This may be caused by, inter alia, an imbalance or asymmetry in the auger, by wear resulting from the former or by a deflection in the weighing elements, etc. Partly due to the fact that feed-mixing devices with at least one vertical mixing auger have a significant market share, it is particularly important to provide a system with calibration which works in a satisfactory manner for such devices.

In embodiments, the M positions are distributed over a rotation of the mixing device. In particular, the M positions are proportionally distributed over a rotation of the mixing device. Thus, the weighing elements will generate as many mutually uncoupled signals as possible, and calibration is also often able to be performed with the greatest degree of accuracy and/or reliability.

In embodiments, at least one, and in particular each, of the M positions comprises a local extreme, in particular a local maximum, for a read-out weighing signal of one of the weighing elements. In most cases, the weighing signal shows an up and down tendency during a rotation of the mixing device for each weighing element. After all, it will hardly ever be the case that the weight of the mixing device is distributed in a perfectly symmetrical way. Extremes in the weighing signal, in particular a position with a minimum weighing signal and a position with a maximum weighing signal, will therefore nearly always occur. By choosing an extreme for one, or advantageously every, weighing signal, the mutual differences between the weighing signals at the different corresponding positions will become relatively large, and the calibration can be performed with relatively great accuracy. This applies in particular if a local, or even absolute, maximum is chosen as the extreme, because then the respective weighing signal is greatest, and the calibration will therefore also be visible most clearly on that weighing signal.

Advantageously, M equals N. That is to say, advantageously, the number of chosen positions M equals the number of weighing elements N. After all, then, in principle, a sufficient number of parameter values is obtained for calculating the required N calibration or correction factors, one for every weighing element. If desired, M is greater than N, in which case the values which are in each case to be determined for the correction factors are for example compared to each other, weight-averaged or otherwise analysed, in order to produce an eventual respective correction factor. It should be noted here that this applies in particular if it is assumed that the weighing elements are and remain linear, so that the calibration can be obtained with a single correction factor. In practice, this will in most cases also be a sufficiently accurate calibration. However, if a highly accurate calibration is desired, it may be necessary to adopt a more complex calibrating function using, for example, a higher order polynomial with, for each weighing element, a plurality of associated calibration factors. However, in practice, this is hardly ever necessary.

It is an advantage of the invention that the calibration can be performed quickly and, if desired, also automatically, as a result of which it can also be performed often. In specific embodiments, the control system is configured to perform the calibrating function after the animal feed has been dispensed from the mixing bin, in particular after every complete delivery of animal feed from the mixing bin. In this case, it applies that the "delivery of the animal feed" is advantageously complete. Although calibration is still possible if the mixing bin is partly or even completely filled, there will virtually always be some movement in the animal feed, as a result of which the weighing signals will in addition vary. This may interfere with the calibration. It is therefore advisable to perform the calibration when the mixing bin is substantially empty. Obviously, this will often be the case, and therefore the calibration can also be performed often, such as even a few times a day. It should be noted that all the calibration requires is to perform measurements during a single rotation of the mixing device (or at most a small number thereof), following which the control system can then process the measurements, such as during further preparatory operations carried out to prepare a subsequent batch of animal feed. Obviously, it is also possible for the control system to be configured to perform the calibration action less often, such as once a day or once a week, in each case advantageously after the animal feed has been completely dispensed from the mixing bin.

In principle, the mixing device can be placed in M different positions in any desired way. In particular, said driving comprises at least a single rotation of the mixing device. Not only is this a simple way of rotating, because the same movement is already performed during use, but, in addition, it is thus possible to ensure that also real local or even absolute extremes in the weighing signals are found. In this case, the control system may also be configured to allow the mixing device to rotate several times in order, in each case, to determine a weighing signal of each weighing element for each position of the M positions, and to average these over the rotations of the mixing device in order to possibly thus achieve an even more accurate calibration result.

As mentioned above, in practice, it will often be the case that the weighing signals will have an up and down tendency during a rotation of the mixing device for each weighing element. Even when added up, these signals will often still have an up and down tendency, albeit often going up and down up to N times more quickly. Since the real weight of the mixing bin with mixing device does not change during a rotation, the added-up signals should not show any change either. Therefore, in advantageous embodiments, the respective correction factors are such that the N calibrated weighing signals produce substantially the same total value in each of the M positions. In this case, a respectively "calibrated weighing signal" is therefore the weighing signal after multiplication by the associated correction factor. Furthermore, the term "substantially" in this context means that the added-up values are equal within a desired error margin, for example within 1% or the like, for example depending on the desired accuracy.

In principle, the selection of said value for the added-up calibrated weighing signals is not subject to any particular limitation. It may be advantageous to use a value as the chosen value which corresponds to the weight of the mixing bin (with mixing device), at least the nominal weight of the mixing bin, which actually amounts to taring the signal. Therefore, in specific embodiments, the respective correction factors are such that, in each of the M positions, the N calibrated weighing signals substantially produce a value which equals the sum of the N weighing signals averaged over at least one rotation of the at least one mixing device. Thus, the respective correction values can be calculated in order to correct effects in the weighing elements. Examples of such effects are deflections or soiling in the suspension of an element, so that for example the same gravitational component in the weight of the mixing bin requires a greater depression of the weighing element, and thus a seemingly higher weight. The calibration serves to correct this again. The correction values are thus chosen such that, on the one hand, the total weight in each of the M positions is equal, and advantageously also equal to the nominal weight of, preferably, the empty mixing bin.

In addition, it is possible to repeat this calibration action with a known weight in the mixing bin. The chosen value is then advantageously equal to the new total weight=weight bin+known weight. Thus, it is then possible, with new measurements for the N weighing elements in in each case M positions, to collect new weighing signals, from which the correction factors can be calculated again. If desired, the correction factors can then be adjusted by comparing or averaging the correction factors for each weighing element.

As mentioned above, the method of analysing the weighing signals is not subject to any particular limitation. However, in advantageous embodiments, performing an analysis comprises formulating and solving a system of equations according to $$GG=\Sigma_{j=1}^{N} aj \times WSij, i=1, \ldots, M$$

in which
GG=total value,
aj=contribution coefficient for weighing element j to measured total value
WSij=weighing signal of weighing element j in position i in which M≥N. This corresponds to the written-out version of an above-described calibration action. Again, it applies that, if M=N, there are a precisely sufficient number of equations for the number of unknowns, and that a greater number of positions results in more measurement signals, from which it is in principle possible to determine the respective correction factors with greater accuracy or at least with greater reliability.

The invention also relates to a method according to Claim 10, in particular a method for calibrating a feed-mixing device which is configured to receive, mix and dispense animal feed, and which feed-mixing device comprises a frame with a mixing bin attached to the frame for receiving and mixing said animal feed therein and dispensing it therefrom, at least one mixing device which is rotatably drivable in the mixing bin, in particular a vertical mixing auger, for said mixing of said received animal feed, and a drive for the at least one mixing device, and a weighing device for determining the weight of the animal feed received in the mixing bin, comprising N weighing elements, N≥2, each of which emits a weighing signal, and a control system for controlling the feed-mixing device and for processing the weighing signals from the plurality of weighing elements to produce the determined weight, wherein the method comprises driving the at least one mixing device, reading out the respective weighing signal of each of the N weighing elements in each of M different positions of the mixing device, with M≥N, calibrating a weighing element, wherein the calibrating at least comprises determining a correction factor for said weighing element by analysing the read-out weighing signals of each of the weighing elements, and multiplying by the control system of the weighing signal of said weighing element by the respective correction factor.

The method according to the invention in principle and substantially provides the same advantages as the feed-mixing device according to the invention, so that superfluous duplications will not be described here. However, it should be noted that the advantages mentioned with the embodiments of the feed-mixing device according to the invention will, in principle, also apply to corresponding embodiments of the method, even if these are not explicitly mentioned below.

Advantageous embodiments of the method are described in the claims dependent on Claim 10, as well as in the following part of the description. Furthermore, it applies that the particular measures and embodiments of the device according to the invention apply in principle also to the method according to the invention, even if these are not explicitly mentioned below.

In embodiments, the method comprises rotating the mixing device at least once, in particular wherein the M positions are distributed over a rotation of the mixing device, more particularly proportionally distributed, and/or wherein at least one, and in particular each, of the M positions comprises a local extreme, in particular a local maximum, for a read-out weighing signal of one of the weighing elements. Thus, all positions are easily accessible again, and advantageously these positions are distributed over the periphery of a rotation, and therefore actually also distributed over the mixing bin.

M is advantageously, but not necessarily, equal to N so as to be able to calculate the correction factors even if there is only a minimum amount of data.

In embodiments, the respective correction factors are chosen such that, in each of the M positions, the N calibrated weighing signals produce substantially the same total value. In this case as well, the sum of the calibrated weighing signals, that is to say the non-calibrated weighing signals in each case multiplied by the associated (eventually calculated) correction factor, is substantially within a desired error margin such as 1% of a total value.

The total value may be chosen, for example, as the nominal weight of the mixing bin, but is not limited thereto. Thus, said total value may be chosen as the sum of the N weighing signals averaged over at least one rotation of the at least one mixing device.

In embodiments, analysing comprises:
formulating and solving a system of equations according to $$GG=\Sigma_{j=1}^{N} aj \times WSij, i=1, \ldots, M$$

in which
GG=total value,
aj=contribution coefficient for weighing element j to measured total value,
WSij=weighing signal of weighing element j in position i, in which M≥N. In other words, the correction values are calculated in such a manner that this system leads to the constant value.

In advantageous embodiments, the method furthermore comprises adding a known weight in the mixing bin and repeating the (analysis/calibration) steps. Thus, it is possible to calculate respective correction factors for a second situation, so that the accuracy, or at least the reliability, can increase further.

Figure 2:
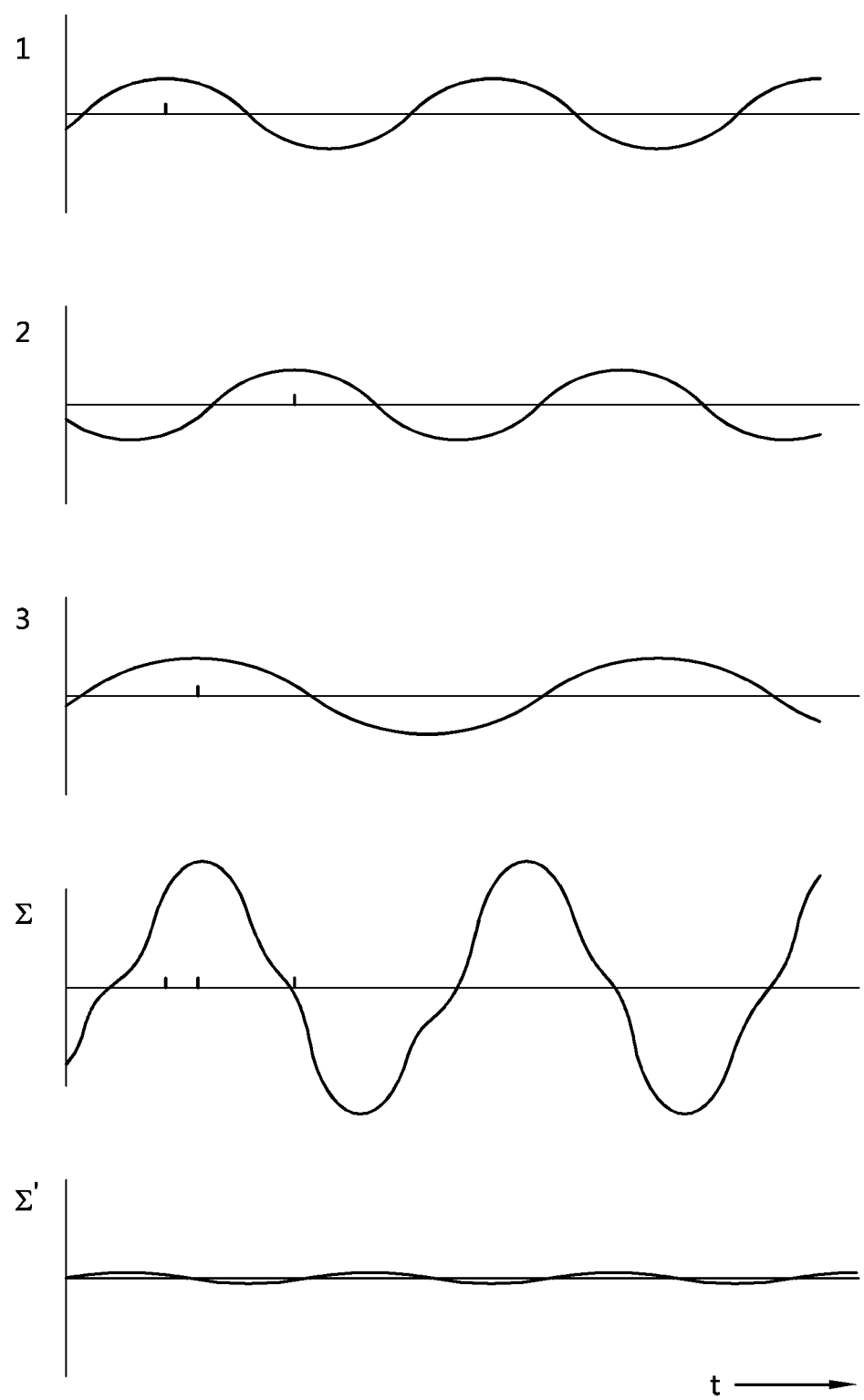

The invention will now be explained in more detail by means of the drawing, in which:

FIG. 1 diagrammatically shows an embodiment of the feed-mixing device according to the invention in perspective, and FIG. 2 diagrammatically shows a result of the method according to the invention.

FIG. 1 diagrammatically shows a perspective view of an embodiment of the feed-mixing device 1 according to the invention. It comprises a frame 2 with on it a mixing bin 3 with a closable opening 4 and with a mixing device 5 with a mixing auger 6 with optional blades 7 in the mixing bin. Reference numeral 8 denotes an amount of animal feed. Reference numerals 9-1 and 9-2 denote two weighing elements and reference numeral 10 denotes a control system.

The feed-mixing device 1 serves to mix feed. To this end, it comprises a mixing bin 3 on a frame 2. The mixing bin is able to receive animal feed 8, which is provided therein in any known manner, such as by hand or by mechanical or other means. In order to mix the feed 8, a mixing device 5 is provided, with a mixing auger 6 which is rotatably drivable by means of a drive which is not described in any more detail here. Optional blades 7 are provided on the mixing auger 6 in order to reduce the size of the animal feed further. After mixing and/or reducing the size of the animal feed, it can be dispensed via the opening 4, which is closable by means of, for example, a door or slide.

It is useful to know how much animal feed is present in the mixing bin 3. To this end, the feed-mixing device 1 comprises a weighing device, here comprising three weighing elements, two of which can be seen, i.e. 9-1 and 9-2. These weighing elements generate weighing signals which are emitted to the control system 10, and comprise, for example, piezo elements, strain gauges or any other known weighing system. The control system 10 processes the weighing signals to produce a weight indication of the animal feed in the mixing bin 3, for example by taring the measured total weight.

It is obviously favourable if this weight indication is accurate and reliable. In practice, the accuracy and reliability of the weighing signals of the weighing elements 9 have been found not to be that accurate and reliable. For example, one or more of the weighing elements may become bent or otherwise go wrong, or may drift electrically or otherwise.

In order to counteract this, the weighing elements 9-1, . . . are often calibrated regularly. To this end, according to the prior art, a weighing element is detached and the weighing signal of the weighing element is determined while it is subjected to a load of one or more known weights. The thinking behind this is that the other weighing elements cannot influence the weighing signal, and thus the calibration, of the weighing element to be calibrated. Although this is correct in principle, it results in a laborious calibration procedure which is not always performed in time for this very reason.

According to the present invention, the weighing elements 9-1, 9-2 are not detached. Instead, the weighing signal is determined in a number of positions of the mixing auger 6 of all weighing elements, in this case three. In other words, in a first position of the mixing auger, a first weighing signal of the first element 9-1 is determined, a second weighing signal of the second weighing element 9-2, as well as a third weighing signal of the weighing element which is not shown. It should be noted that it is also possible that more than three, or optionally only two, weighing elements may be provided, but that the underlying principle remains the same. The distribution is not limited in principle either, but often this distribution will be regular, so that the weighing elements will be provided at every 120°. Said weighing signals may be determined substantially simultaneously, that is to say for one and the same point in time, in particular with a moving mixing auger, but it is also possible to stop the mixing auger in the position, and to subsequently determine the weighing signals.

This procedure is repeated for a number of positions of the mixing auger, with the total number of positions being at least equal to the number of weighing elements. Thus, in the present case at least three sets of weighing signals are obtained, for each set in each case a signal for each of the weighing elements 9-1, 9-2, . . . .

It is also possible to record the weighing signals continuously, with a coupling with time, in order then to plot the weighing signals and analyse them. FIG. 2 diagrammatically shows examples of such weighing signals. Signal "1" indicates the weighing signal for weighing element 9-1, signal "2" for weighing element 9-2 and signal "3" for the third weighing element which is not shown. "Σ" represents the sum of the three weighing signals "1", "2" and "3". "Σ'" is the final calibrated sum weighing signal, and the way in which it is obtained will be described below.

The respective weighing signal of each weighing element 9-1, 9-2, . . . , is measured during some rotations of the mixing auger. These signals 1 to 3 are plotted in the upper three parts of FIG. 2. For each weighing signal, the maximum has been determined, which is indicated in the figure by a small line on the horizontal axis. Here, the respective weighing signal is thus greatest in each case, and the contribution to the total weighing signal will also be greatest, but in particular the possible relative deviation of the total weighing signal is also greatest at that point in time. If a weighing signal of a weighing element shows a deviation and, assuming that this weighing element/weighing signal is linear, this deviation will also be greatest with such a maximum.

The points in time of the respective maximums are also indicated in the sum signal "Σ". The average of sum signal over one or more rotations is now considered to be a given, namely the empty weight GG of the mixing bin. The idea is that the added-up individual weighing signals, following correction of each one of them by means of a respective calibration factor/correction factor, now have to result in a value which is constant over time, in principle obviously the abovementioned empty weight.

This leads to the following formulae which have already been mentioned above:

$$GG = \Sigma_{j=1}^{3} aj \times WSij, i=1, \ldots ,3$$

in which

GG=total value, or the empty weight, aj=calibrated contribution coefficient for weighing element j to measured total value, WSij=weighing signal of weighing element j in position i, measured at a corresponding maximum of one of the three weighing elements.

In the present case, this results in a system of three linear equations with three unknowns. This system may be solved using matrix-sweeping, method of least squares or any other known technique for the physically relevant values of aj. The mathematical techniques used for this purpose are known per se and also do not fall within the scope of this invention.

In the illustrated case, the resulting values for aj result in a total weighing signal of the three added-up weighing signals which is illustrated in "Σ'", and which shows a significantly smaller variation over time. Thus, a more accurate and more reliable weighing signal is obtained, which can be used by the control system 10 for controlling the feed-mixing device 1. For example, a more accurate signal can be provided for additional animal feed to be mixed. Other applications are conceivable by the person skilled in the art.

The illustrated embodiments only serve as an explanation of the invention and are not intended to limit the latter. The scope of protection is defined in the attached claims.

The invention claimed is:

1. A feed-mixing device configured to receive, mix and dispense animal feed, comprising:
   a frame comprising:
     a mixing bin attached to the frame for receiving and mixing said animal feed therein and dispensing the animal feed therefrom;
     at least one mixing device rotatably drivable in the mixing bin for said mixing of said received animal feed;

a drive for the at least one mixing device; and a weighing device for determining the weight of the animal feed received in the mixing bin, comprising N weighing elements, N≥2, each of weighing elements emitting a weighing signal; and a control system for controlling the feed-mixing device and for processing the weighing signals from the weighing elements to produce the determined weight, wherein the control system is configured to perform a calibration action of said weighing elements, wherein the calibration action comprising:

driving the at least one mixing device;

reading out the respective weighing signal of each of the N weighing elements in each of M different positions of the mixing device, with M≥N; and calibrating the weighing elements on the basis of the read-out weighing signals, wherein the calibrating at least comprises determining a respective correction factor for the weighing signal of each weighing element by analysing the read-out weighing signals of all weighing elements.

2. The feed-mixing device according to claim 1, wherein the M positions are distributed over a rotation of the mixing device.

3. The feed-mixing device according to claim 2, wherein at least one of the M positions comprises a local extreme for a read-out weighing signal of one of the weighing elements.

4. The feed-mixing device according to claim 2, wherein M equals N.

5. The feed-mixing device according to claim 2, wherein the control system is configured to perform the calibrating function after the animal feed has been dispensed from the mixing bin.

6. The feed-mixing device according to claim 1, wherein at least one of the M positions comprises a local extreme for a read-out weighing signal of one of the weighing elements.

7. The feed-mixing device according to claim 6, wherein M equals N.

8. The feed-mixing device according to claim 6, wherein the control system is configured to perform the calibrating function after the animal feed has been dispensed from the mixing bin.

9. The feed-mixing device according to claim 1, wherein M equals N.

10. The feed-mixing device according to claim 1, wherein the control system is configured to perform the calibrating function after the animal feed has been dispensed from the mixing bin.

11. The feed-mixing device according to claim 1, wherein said driving comprises rotating the mixing device at least once.

12. The feed-mixing device according to claim 1, wherein the respective correction factors are such that the N calibrated weighing signals produce substantially the same total value in each of the M positions.

13. The feed-mixing device according to claim 1, wherein the respective correction factors are such that, in each of the M positions, the N calibrated weighing signals substantially produce a value which equals the sum of the N weighing signals averaged over at least one rotation of the at least one mixing device.

14. The feed-mixing device according to claim 1, wherein analysing comprises:

formulating and solving a system of equations according to $$GG = \Sigma_{j=1}^{N} aj \times WSij, \ i=1,\ldots,M$$

in which
GG=total value,
aj=contribution coefficient for weighing element j to measured total value, and
WSij=weighing signal of weighing element j in position i in which M≥N.

15. A method for calibrating a feed-mixing device which is configured to receive, mix and dispense animal feed, comprising:

a frame with:

a mixing bin attached to the frame for receiving and mixing said animal feed therein and dispensing the animal feed therefrom;

at least one mixing device rotatably drivable in the mixing bin for said mixing of said received animal feed;

a drive for the at least one mixing device; and a weighing device for determining the weight of the animal feed received in the mixing bin, comprising N weighing elements, N≥2, each of which emits a weighing signal, signal; and a control system for controlling the feed-mixing device and for processing the weighing signals from the weighing elements to produce the determined weight, wherein the method comprises:

driving the at least one mixing device;

reading out the respective weighing signal of each of the N weighing elements in each of M different positions of the mixing device, with M≥N; and calibrating a weighing element, wherein the calibrating at least comprises determining a correction factor for said weighing element by analysing the read-out weighing signals of each of the weighing elements, and multiplying by the control system of the weighing signal of said weighing element by the respective correction factor.

16. The method according to claim 15, further comprising rotating the mixing device at least once, wherein the M positions are distributed over a rotation of the mixing device, and/or wherein at least one of the M positions comprises a local extreme for a read-out weighing signal of one of the weighing elements.

17. The method according to claim 15, wherein M equals N.

18. The method according to claim 15, wherein the respective correction factors are chosen such that, in each of the M positions, the N calibrated weighing signals produce substantially the same total value.

19. The method according to claim 18, wherein said total value is chosen as the sum of the N weighing signals averaged over at least one rotation of the at least one mixing device.

20. The method according to claim 15, wherein analysing comprises:

formulating and solving a system of equations according to $$GG = \Sigma_{j=1}^{N} aj \times WSij, \ i=1,\ldots,M$$

in which
GG=total value,
aj=contribution coefficient for weighing element j to measured total value, and
WSij=weighing signal of weighing element j in position i, in which M≥N.

* * * * *